US010303438B2

(12) United States Patent
Babinsky et al.

(10) Patent No.: US 10,303,438 B2
(45) Date of Patent: May 28, 2019

(54) FUSED-MULTIPLY-ADD FLOATING-POINT OPERATIONS ON 128 BIT WIDE OPERANDS

(71) Applicant: INTERNATIONAL BUSINESS MACHINES CORPORATION, Armonk, NY (US)

(72) Inventors: Tina Babinsky, Boeblingen (DE); Udo Krautz, Boeblingen (DE); Klaus M. Kroener, Boeblingen (DE); Silvia M. Mueller, Boeblingen (DE); Andreas Wagner, Boeblingen (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 48 days.

(21) Appl. No.: 15/406,910

(22) Filed: Jan. 16, 2017

(65) Prior Publication Data

US 2018/0203667 A1    Jul. 19, 2018

(51) Int. Cl.
*G06F 5/01* (2006.01)
*G06F 7/483* (2006.01)
*G06F 7/544* (2006.01)

(52) U.S. Cl.
CPC .............. *G06F 7/483* (2013.01); *G06F 5/012* (2013.01); *G06F 7/5443* (2013.01)

(58) Field of Classification Search
CPC .......... G06F 7/483; G06F 7/485; G06F 7/487; G06F 7/4876; G06F 7/49936; G06F 7/57; G06F 7/575
USPC ......................................... 708/209, 501, 506
See application file for complete search history.

(56) References Cited

U.S. PATENT DOCUMENTS

| | | | |
|---|---|---|---|
| 7,593,977 | B2 | 9/2009 | Cornea-Hasegan |
| 7,720,900 | B2 | 5/2010 | Gerwig et al. |
| 8,037,118 | B2 | 10/2011 | Quinnell et al. |
| 8,671,129 | B2 | 3/2014 | Brooks et al. |
| 8,868,632 | B2 | 10/2014 | Cornea-Hasegan |

(Continued)

FOREIGN PATENT DOCUMENTS

| | | |
|---|---|---|
| CA | 104321741 A | 1/2015 |
| WO | WO 2014/004220 A1 | 4/2014 |

(Continued)

OTHER PUBLICATIONS

Huang et al., "Low-Cost Binary128 Floating-Point FMA Unit Design with SIMD Support", IEEE Transactions on Computers, vol. 61, Issue 5, May 2012, (pp. 745-751).

(Continued)

*Primary Examiner* — Andrew Caldwell
*Assistant Examiner* — Emily E Larocque
(74) *Attorney, Agent, or Firm* — William Kinnaman, Esq.; Kevin P. Radigan, Esq.; Heslin Rothenberg Farley & Mesiti P.C.

(57) ABSTRACT

A floating-point unit, configured to implement a fused-multiply-add operation on three 128 bit wide operands is provided, which includes a 113×113-bit multiplier; a left shifter; a right shifter; a select circuit including a 3-to-2 compressor; an adder connected to the dataflow from the select circuit; a first feedback path connecting a carry output of the adder to the select circuit; a second feedback path connecting the output of the adder to the shifters for passing an intermediate wide result through the shifters.

23 Claims, 5 Drawing Sheets

(56) References Cited

U.S. PATENT DOCUMENTS

| | | |
|---|---|---|
| 9,104,474 B2 | 8/2015 | Kaul et al. |
| 9,122,517 B2* | 9/2015 | Boersma ............... G06F 7/483 |
| 9,542,154 B2 | 1/2017 | Rubanovich et al. |
| 9,990,080 B2 | 6/2018 | Shin et al. |
| 2003/0158879 A1 | 8/2003 | Kwon et al. |
| 2006/0117082 A1 | 6/2006 | Lutz et al. |
| 2006/0179093 A1* | 8/2006 | Powell, Jr. ............. G06F 7/483 |
| | | 708/204 |
| 2006/0184601 A1* | 8/2006 | Trong .................... G06F 7/483 |
| | | 708/495 |
| 2010/0063987 A1* | 3/2010 | Boersma ............... G06F 7/4991 |
| | | 708/495 |
| 2011/0040815 A1 | 2/2011 | Penton et al. |
| 2012/0011181 A1 | 1/2012 | Samy et al. |
| 2012/0016919 A1* | 1/2012 | Anderson ............... G06F 5/017 |
| | | 708/209 |
| 2012/0072703 A1 | 3/2012 | Srinivasan et al. |
| 2012/0215823 A1* | 8/2012 | Lutz ....................... G06F 7/485 |
| | | 708/209 |
| 2013/0181942 A1 | 7/2013 | Bulea et al. |
| 2014/0004220 A1 | 1/2014 | Coudiere |
| 2014/0006467 A1 | 1/2014 | Samudrala et al. |
| 2014/0188966 A1 | 7/2014 | Galal et al. |
| 2014/0379773 A1 | 12/2014 | Rubanovich et al. |
| 2015/0179122 A1 | 6/2015 | Brown et al. |
| 2015/0370537 A1 | 12/2015 | Kim et al. |
| 2016/0048374 A1 | 2/2016 | Argade et al. |
| 2016/0077802 A1 | 3/2016 | Samudrala et al. |
| 2016/0098249 A1 | 4/2016 | Carlough et al. |
| 2017/0039033 A1 | 2/2017 | Samudrala et al. |
| 2017/0090868 A1 | 3/2017 | Lutz |

FOREIGN PATENT DOCUMENTS

| | | |
|---|---|---|
| WO | WO 2016/199263 A1 | 12/2016 |
| WO | WO 2018/130925 A1 | 7/2018 |

OTHER PUBLICATIONS

Nathan et al., "Recycled Error Bits: Energy-Efficient Architectural Support for Floating Point Accuracy", International Conference for High Performance Computing, Networking, Storage and Analysis, Nov. 16-21, 2014, (pp. 117-127).

Jose et al., "Floating-Point Single-Precision Fused Multiplier-adder Unit on FPGA", ISBN: 978-989-98875-1-0, 2014, (pp. 15-21).

Erle et al., "Decimal Floating-Point Multiplication Via Carry-Save Addition", 18th IEEE Symposium on Computer Arithmetic (ARITH '07), 2007, 10 pages.

Jun et al., "Design and Implementation of a Quadruple Floating-Point Fused Multiply-Add Unit", Proceedings of the 2nd International Converence on Computer Science and Electronics Engineering (ICCSEE 2013), Atlantic Press, pp. 1749-1753.

Kroener et al., "Tiny Detection in a Floating-Point Unit", U.S. Appl. No. 15/646,543, dated Jul. 11, 2017 (36 pages).

Kroener et al., "Tiny Detection in a Floating-Point Unit", U.S. Appl. No. 15/810,033, dated Nov. 11, 2017 (34 pages).

Babinsky et al., "List of IBM Patents and/or Patent Applications Treated as Related", U.S. Appl. No. 15/406,910, filed Jan. 16, 2017, dated Nov. 14, 2018 (2 pages).

* cited by examiner

FUSED-MULTIPLY-ADD FLOATING-POINT OPERATIONS ON 128 BIT WIDE OPERANDS

BACKGROUND

The present invention relates in general to data processing systems, in particular, to a unit, method, system and computer program product for performing fused-multiply-add floating-point operations on 128 bit wide operands.

The IEEE-754-2008 Standard for Binary Floating Point Arithmetic, published in 2008, specifies a floating point data architecture that is commonly implemented in computer hardware, such as floating point processors having multipliers. The format consists of a sign, an unsigned biased exponent, and a significand. The sign bit is a single bit and is represented by an "S". The unsigned biased exponent, represented by an "e", is for example, 8 bits long for single precision, 11 bits long for double precision and 15 bits long for quadruple precision. The significand is, for instance, 24 bits long for single precision, 53 bits long for double precision and 113 bits long for quadruple precision. As defined by the IEEE-754-2008 standard, the most significant bit of the significand, i.e. the so called implicit bit, is decoded out of the exponent bits.

To improve floating-point arithmetic processing most modern processors use a process called the fused-multiply-add (in the following abbreviated as FMA) process to combine a floating-point multiplication operation, e.g., A×B, and a floating point addition operation, e.g., +C, for execution as a single instruction, e.g., A×B+C, where A, B, C are operands of the multiplication product A×B and the sum of C and the product. By performing two operations in a single instruction, the FMA process reduces overall execution time. The FMA process also provides improved precision because rounding need only be performed after both the multiplication and addition operations are performed at full precision. For instance, there is only one rounding error instead of two.

Analytics applications, especially when running on large data amounts, are very compute intensive. Their main data types are binary floating-point. This includes commercially available analytics software like ILOG, SPSS, Cognos, Algo, and many specialized analytics packages for the insurance and banking sectors.

Many mobile applications require location detection routines, which also are floating-point intensive calculations. Performance of these routines are key in emerging sectors like telematics, which combines mobile input with database queries and insurance analytics codes and has real-time requirements.

With growing problem size, numerical sensitivities of the algorithms are magnified. That degrades the stability of the algorithms and reduces the speed of convergence. This is a well know effect in the high performance arena. The easiest way to address this issue is to switch the mathematically critical routines from double precision to quad precision floating-point (128 bit).

With Big Data Analytics, this numerical stability issue is also hitting the commercial space. For example, convergence issues for very large ILOG installations and for client's risk assessment codes running on large data sets are noticed. For that large ILOG installations, 15-30% faster convergence is noticed when switching to 128 bit floating-point calculations.

By way of example, US 2016/0048374 A1 discloses techniques for emulating fused-multiply-add (FMA) operations via the use of assist instructions. According to the techniques of this disclosure, FMA operations are emulated via assist instructions such that existing hardware for performing unfused-multiply-add operations may be used to emulate fused-multiply-add operations without requiring other specialized hardware.

Emulating a fused-multiply-add operation for a first operand, a second operand, and a third operand includes determining, by at least one processor, an intermediate value based at least in part on multiplying a first operand with a second operand. Existing methods further include determining, by the at least one processor, at least one of an upper intermediate value or a lower intermediate value, wherein determining the upper intermediate value includes rounding, towards zero, the intermediate value by a specified number of bits, and wherein determining the lower intermediate value includes subtracting the intermediate value by the upper intermediate value. The method further includes determining, by the at least one processor, an upper value and a lower value based at least in part on adding a third operand to one of the upper intermediate value or the lower intermediate value. The method further includes determining, by the at least one processor, an emulated fused-multiply-add result for the first operand, the second operand, and the third operand by adding the upper value and the lower value.

U.S. Pat. No. 9,104,474 B2 discloses methods and circuits for energy efficient floating-point multiply and/or add operations. The embodiments provide energy-efficient variable-precision multiply and/or add operations while keeping track of how many mantissa bits of a floating-point number may be certain and/or provide an energy efficient floating-point multiplication that includes a replay of the multiplication when a lowest portion of a multiplication result could affect the final result.

The variable precision floating-point circuit uses real-time certainty tracking to provide run-time precision selection. The certainty tracking enables low-precision calculations, whose result may be uncertain, to be redone with higher precision if necessary. Because the certainty may be dependent upon the data, it is determined along with the numerical computations. The circuits keeping track of the certainty add minimal overhead, while the majority of calculations produce correct results with lower precisions.

The floating-point multiplication steps are performed by an N-bit by N-bit multiplier (N×N-bit multiplier) circuit including a parallelogram configured to set carries of a predetermined number of least significant bits of a multiplication product to zero for a multiplication operation, and a detection circuit to induce a replay of the multiplication operation by the multiplier to generate a full multiplication result if necessary.

The variable precision floating-point circuit determines the certainty of the result of a multiply add floating-point calculation in parallel with the floating-point calculation. The variable precision floating-point circuit uses the certainty of the inputs in combination with information from the computation, such as, binary digits that cancel, normalization shifts, and rounding, to perform a calculation of the certainty of the result. A variable precision floating point circuit includes a variable precision mantissa unit that supports multiple precisions, multiple exponent data paths that support a maximum parallelism at a lowest precision, and certainty calculation units that provide certainty bounds of the outputs.

On processors according to the state of the art as described above, 128 bit floating-point operations are emulated in software. The described methods are usually one to two orders of magnitude slower than a hardware implementation, which make them less attractive for Big Data Analytics.

SUMMARY

In one or more aspects, a floating-point unit is provided, which is configured to implement a fused-multiply-add operation on three 128 bit wide operands. The floating-point unit includes: a 113×113-bit multiplier connected to the dataflow for multiplication operands and configured to compute a 226-bit-carry-save product iteratively, wherein a sum term and a carry term are separated into a high part and a low part of the product; a left shifter connected to the dataflow for a high part and a low part of an addend operand, configured to deliver an aligned part of the addend; a right shifter connected to the dataflow for the high part and a low part of the addend operand, configured to deliver the aligned part of the addend; a select circuit connected to the outputs of the shifters including a 3-to-2 compressor to combine the sum term and the carry term with the addend; an adder connected to the dataflow from the select circuit; a first feedback path connecting a carry output of the adder to the select circuit for performing a wide addition operation of the intermediate product and the aligned addend for the high parts and the low parts in two subsequent additions; and a second feedback path connecting the output of the adder to the shifters for passing an intermediate wide result through the shifters for normalization and a second pass through the adder for rounding.

A value of a fused-multiply-add operation (FMA) is that one instruction performs two operations: a multiply operation and an add operation, thus achieving twice the throughput. However, the much higher value of the FMA is the enhanced accuracy of the combined operation: the addition is performed on the exact product and the exact addend.

For 128 bit floating-point calculations the rounding effect can be more severe. Thus, switching to 128 bit floating-point calculations provides higher accuracy for an FMA, and is thus advantageous. Yet, the 128 bit FMA must have a decent performance as well, to make it attractive and usable for applications.

In floating-point processors one central area is the multiplier array. The multiplier array is used to do multiplication of two numbers. Usually state-of-the-art Booth's encoding with radix 4 is employed, which is a commonly used fast multiplication algorithm. This reduces the number of product terms that need to be summed up to n/2+1, where n is the number of bits per operand. The summation is done using a carry-save-adder circuitry which allows processing of all bits in parallel, as opposed to the normal addition where the carry-out of the lower bit position is chained to the next higher position, which is performed usually by a carry-propagate-adder circuitry. The circuitry that does this summation is known in the art as a reduction tree. At the end of the reduction tree there remain two terms, the sum term and the carry term, which represent a summation part of information and a carry part of information, respectively. These terms finally are added with the aligned addend. Again, a carry-save-addition is performed here. Finally, only two terms remain, also a sum term and a carry term, and these two terms must be added using the carry-propagate-adder to generate one final result.

Advantageously, the inventive floating-point unit (FPU) discussed herein allows, due to its configuration, a 128-bit FMA operation to execute on a conventional 128 bit floating-point unit with an add-based data flow, as introduced, e.g., in the IBM z13 processor. With only moderate hardware extensions, embodiments of the invention allow a true FMA with 128 bit precision to execute on a 128 bit add-based FPU with the same 23 cycle latency as a multiply operation. A new operation can be started every 15 cycles, which is over 5 times faster and with a 7.5 times higher throughput than, e.g., on other processors which emulate the operation on a 64-bit FMA based floating-point unit.

Advantageously, according to embodiments of the invention, extensions to a conventional FMA unit for 128 bit floating-point operations are an operand latch and an unpack circuit for the third operand. Further a multiplier is added, wherein, to save circuit area, the multiplier computes the 113×113 bit product in an iterative manner. In certain embodiments of the invention, it may need 7 iterations to compute the full product. The multiplier delivers the product in a carry-save format. Further, a left shifter is added, which may be connected to a register of a conventional FMA unit. This could also be obtained by making the right-shifter a rotator and using it in subsequent cycles. Further, the select circuit after the shifter is enhanced by a 3-to-2 compressor, to combine the two product terms with the addend. Further, a leading zero counter is connected to the unpack circuit of the addend. Further, there are also feedback paths from an output of the adder to the select circuit as an additional input to the adder, to perform the wide addition of the intermediate product and the unrounded sum. The feedback path back to the shifters via the select/swap circuit is used for passing the intermediate wide result through the shifters for normalization and a second pass through the adder for rounding.

For clarification, it may be noted that a shifter may be implemented as a shifter circuit, an adder as an adder circuit and a counter as a counter circuit.

The blocks added to the add-based data flow as the multiplier and feedback paths are used to support a 128-bit floating-point multiplication. The other blocks are an overhead for the multiply-add operation. The 128 bit FMA is emulated on this data flow, by circulating around multiple times.

According to an advantageous embodiment, the multiplier may be configured to compute the high part and the low part of the product sequentially. Thus, it is possible to compute a quad precision product in an effective way.

According to an advantageous embodiment, the unit may include a component to align the product to the addend, if an exponent of the addend minus a number of leading zeroes of the addend is greater than an exponent of the product plus a constant, where the constant is at least two. By this way the addend and the product may be added and rounded in an effective manner by the adder and rounder unit.

According to an advantageous embodiment, the unit may include a component to align the high parts and the low parts of the product to the addend and merging to a single data part. This enables to compute a quad precision product in an effective way.

According to an advantageous embodiment, the unit may include a component to align the addend to the product by the left and/or right shifter, if an exponent of the addend minus a number of leading zeroes of the addend is less or equal to an exponent of the product plus a constant, where the constant is at least two. By this way the addend and the product may be added and rounded in an effective manner by the adder and rounder unit.

According to an advantageous embodiment, the unit may include a component to align the high part and the low part of the addend separately to the product by the left and/or right shifter. Thus, double precision units may be used for computing quad precision operands.

According to an advantageous embodiment, the unit may include a component to add the high parts and the low parts of the product and the addend by the select circuit and the 3-to-2 compressor, in the case of an effective add operation. This achieves to compute quad precision operands on double precision units.

According to an advantageous embodiment, the unit may include a component to compute as a result the negated sum of the product and the negated addend, if a result of an end-around-carry operation equals to zero, otherwise computing as a result the sum of the product and the negated addend plus one, in the case of an effective subtract operation. Thus, final rounding or normalization of the result may be achieved.

Further, a method for performing binary floating-point arithmetic calculations in a floating-point unit is provided, where the floating-point unit is configured to implement a fused-multiply-add operation on three 128 bit wide operands. The method includes: computing a 226-bit-carry-save product of the multiplication operands iteratively by a 113×113-bit multiplier, wherein a sum term and a carry term are separated into a high part and a low part of the product; aligning a high part and a low part of an addend operand by a left shifter connected to the dataflow, configured to deliver an aligned part of the addend; aligning the high part and the low part of the addend operand of the addend operand by a right shifter connected to the dataflow, configured to deliver the aligned part of the addend; combining the two product terms with the addend by a select circuit connected to the outputs of the shifters including a 3-to-2 compressor; operating an adder connected to the dataflow from the select circuit; performing wide addition of the intermediate product and the aligned addend for the high parts and the low parts in two subsequent additions with a first feedback path connecting a carry output of the adder to the select circuit; and passing an intermediate wide result through the shifters for normalization and a second pass through the adder for rounding in a second feedback path connecting the output of the adder to the shifters.

The inventive method may be implemented for a fused-multiply-add operation on three 128 bit operands using advantageously a floating-point unit as described above.

According to an advantageous embodiment, the high part and the low part of the product may be computed sequentially by the multiplier. Thus, it is possible to compute a quad precision product in an effective way.

According to an advantageous embodiment, the product may be aligned to the addend, if an exponent of the addend minus a number of leading zeroes of the addend is greater than an exponent of the product plus a constant, where the constant is at least two. By this way, the addend and the product may be added and rounded in an effective manner by the adder and rounder unit.

According to an advantageous embodiment, the high parts and the low parts of the product may be aligned to the addend and merging to a single data part. This enables to compute a quad precision product in an effective way.

According to an advantageous embodiment, the addend may be aligned to the product by the left and/or right shifter, if an exponent of the addend minus a number of leading zeroes of the addend is less or equal to an exponent of the product plus a constant, where the constant is at least two. By this way, the addend and the product may be added and rounded in an effective manner by the adder and rounder unit.

According to an advantageous embodiment, the high part and the low part of the addend may be aligned separately to the product by the left and/or right shifter. Thus, double precision units may be used for computing quad precision operands.

According to an advantageous embodiment, in the case of an effective add operation, the high parts and the low parts of the product and the addend may be added by the select circuit and the 3-to-2 compressor. This achieves to compute quad precision operands on double precision units.

According to an advantageous embodiment, in the case of an effective subtract operation, the negated sum of the product and the negated addend may be computed as a result, if a result of an end-around-carry operation equals to zero, otherwise the sum of the product and the negated addend plus one may be computed as a result. Thus, final rounding or normalization of the result may be achieved.

In one or more further aspects, a computer program product is provided for performing binary floating-point arithmetic calculations in a floating-point unit, where the floating-point unit is configured to implement a fused-multiply-add operation on three 128 bit wide operands. The computer program product includes a computer readable storage medium having program instructions embodied therewith, the program instructions executable by a processor to cause the processor to perform a method including: computing a 226-bit-carry-save product of the multiplication operands iteratively by a 113×113-bit multiplier, wherein a sum term and a carry term are separated into a high part and a low part of the product; aligning a high part and a low part of an addend operand by a left shifter connected to the dataflow, configured to deliver an aligned part of the addend; aligning the high part and the low part of the addend operand by a right shifter connected to the dataflow, configured to deliver the aligned part of the addend; combining the two product terms with the addend by a select circuit connected to the outputs of the shifters including a 3-to-2 compressor; operating an adder connected to the dataflow from the select circuit; performing wide addition of the intermediate product and the aligned addend for the high parts and the low parts in two subsequent additions with a first feedback path connecting a carry output of the adder to the select circuit; and passing an intermediate wide result through the shifters for normalization and a second pass through the adder for rounding in a second feedback path connecting the output of the adder to the shifters.

Further, a data processing system for execution of a data processing program is disclosed, including computer readable program instructions for performing a method described above.

Additional features and advantages are realized through the techniques of the present invention. Other embodiments and aspects of the invention are described in detail herein and are considered a part of the claimed invention.

BRIEF DESCRIPTION OF THE DRAWINGS

The present invention together with the above-mentioned and other objects and advantages may best be understood from the following detailed description of the embodiments, but not restricted to the embodiments, where.

DETAILED DESCRIPTION

Figure 1:
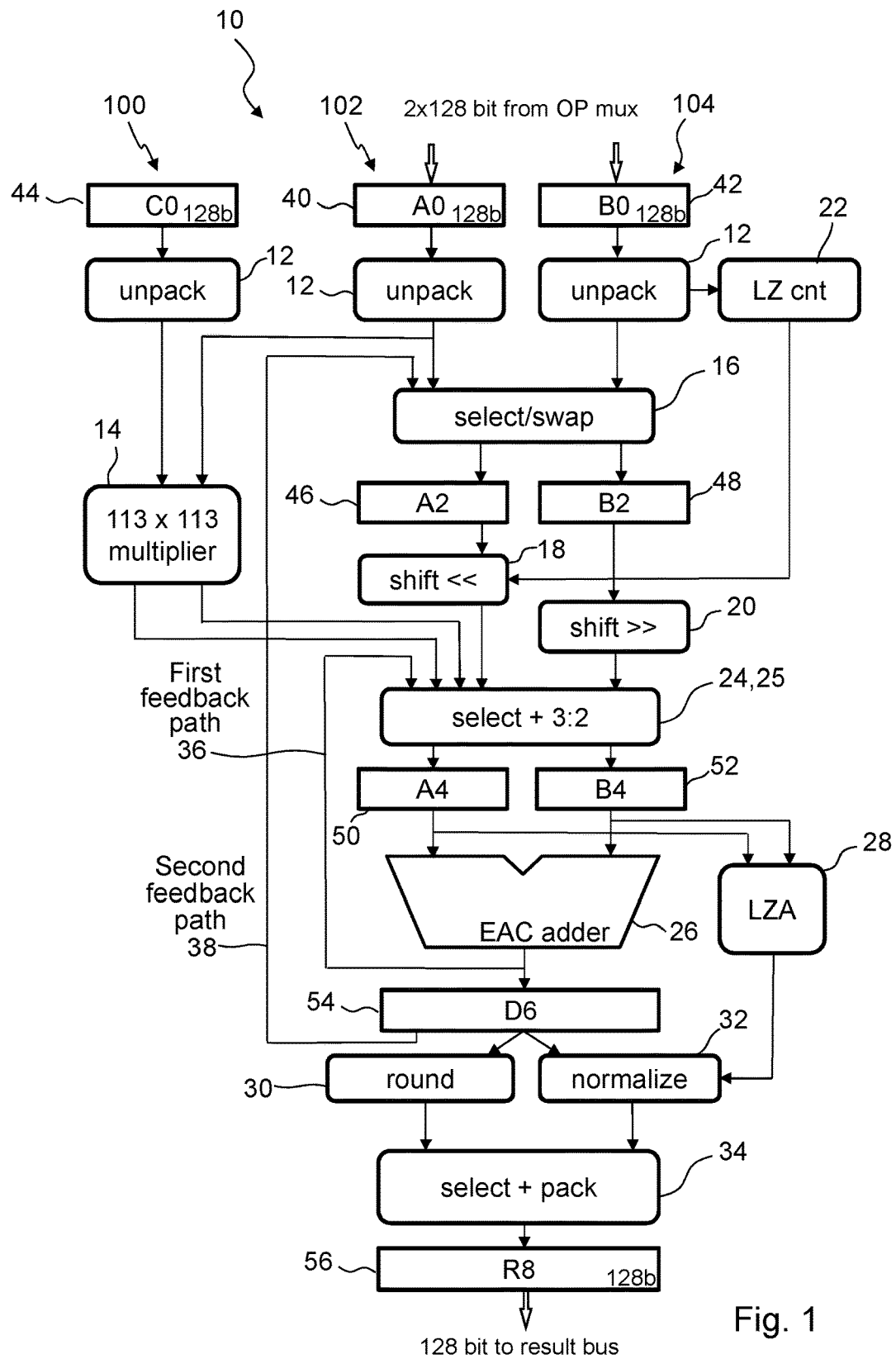
FIG. 1 depicts a data flow of a floating-point unit according to an embodiment of the invention for performing binary floating-point arithmetic calculations, the floating-point unit being configured to implement a fused-multiply-add operation on three 128 bit wide operands A, B, C for an A×C+B operation.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a unit, method, system and computer program product for implementing a fused-multiply-add operation (FMA) on three 128 bit wide operands. The illustrative embodiments are sometimes described herein using particular technologies only as an example for the clarity of the description.

The illustrative embodiments may be used for implementing a fused-multiply-add operation on three 128 bit wide operands on the inventive floating-point unit.

FIG. 1 depicts a data flow of the floating-point unit 10 according to an embodiment of the invention for performing binary floating-point arithmetic calculations, where the floating-point unit 10 is configured to implement a fused-multiply-add operation on three 128 bit wide operands A (102), B (104), C (100) for an A×C+B operation.

According to one or more embodiments of the invention, a 128-bit FMA thus may be executed on a conventional 128-bit floating-point unit with an add-based data flow with only moderate hardware extensions.

The floating-point unit (FPU) 10, includes a 113×113-bit multiplier 14 connected to the dataflow for multiplication operands 100, 102 and configured to compute a 226-bit-carry-save product 70 iteratively, wherein a sum term 71 and a carry term 74 are separated into a high part 72, 75 and a low part 73, 76 of the product 70. Details to the separation into sum term 71 and carry term 74 as well as high part 72, 75 and low part 73, 76 are depicted in the data flow in FIG. 3.

Figure 3:
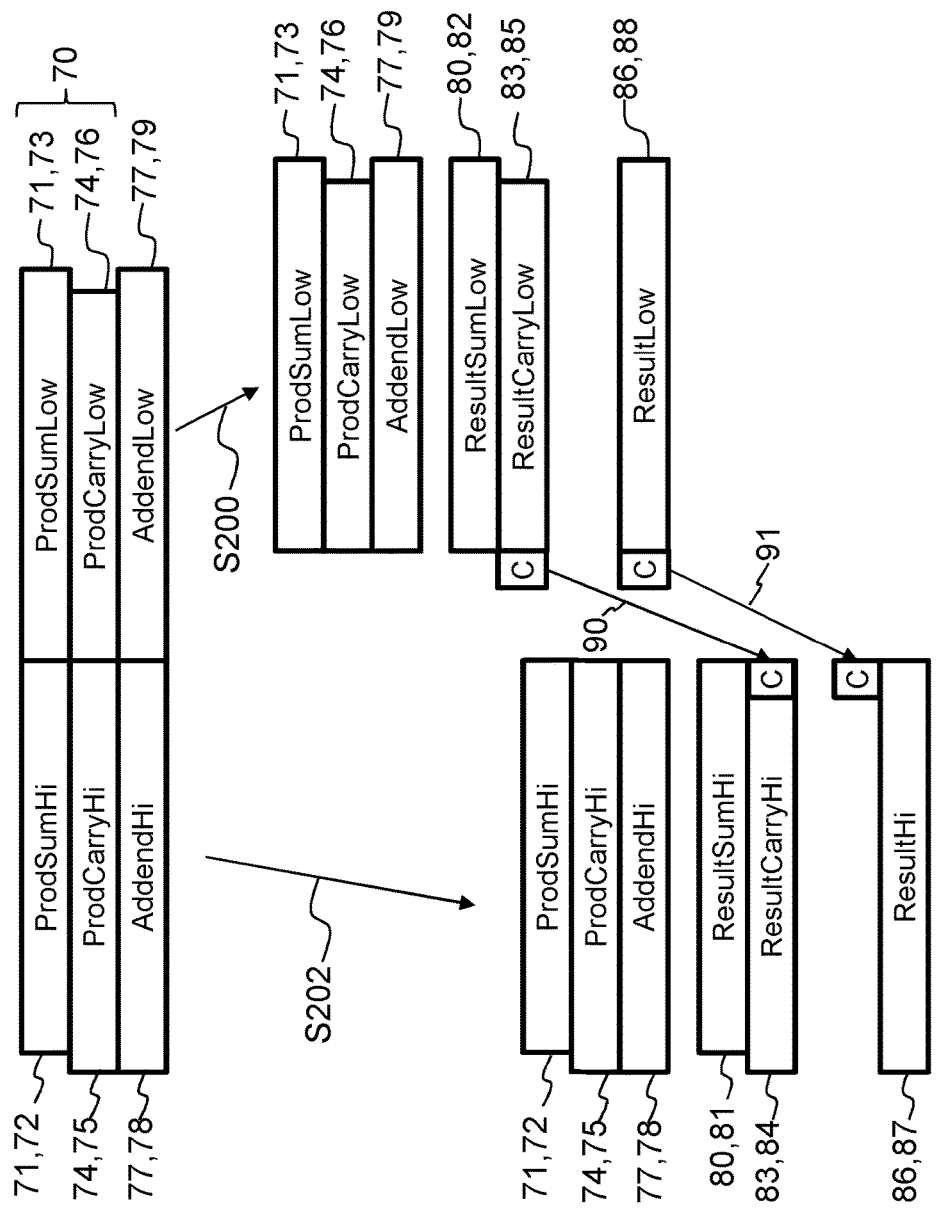
FIG. 3 depicts a data flow in the adder loops, separated into high parts and low parts of the data according to an embodiment of the invention.

Referring to FIGS. 1 & 3 the FPU 10 further includes a left shifter 18 connected to the dataflow, for a high part 78 and a low part 79 of the addend operand 104, configured to deliver an aligned part of the addend 77, and a right shifter 20 connected to the dataflow for the high part 78 and the low part 79 of the addend operand 104, configured to deliver the aligned part of the addend 77. Further the FPU 10 includes a select circuit 24 connected to the outputs of the shifters 18, 20 including a 3-to-2 compressor 25 to combine the sum term 71 and the carry term 74 with the addend 77; and an adder 26 connected to the dataflow from the select circuit 24. Additionally the FPU 10 includes a first feedback path 36 connecting a carry output 91 of the adder 26 to the select circuit 24 for performing a wide addition operation of the intermediate product 70 and the aligned addend 77 for the high parts 72, 75, 78 and the low parts 73, 76, -79 in two subsequent additions; and a second feedback path 38 connecting the output of the adder 26 to the shifters 18, 20 for passing an intermediate wide result 86 through the shifters 18, 20 for normalization and a second pass through the adder 26 for rounding.

One additional shifter 18 is sufficient, because data flow is such that the bigger operand is always the first operand according to one or more embodiments of the inventive method.

The 226-bit wide multiplier result as a product 70 in a sum term 71 and a carry term 74 is separated into a low part 73, 76 and a high part 72, 75 to fit into the narrow 128-bit FPU adder 26. The low part 73, 76 and the high part 72, 75 are sent sequentially through the adder 26. Finally, the low part 73, 76 and the high part 72, 75 get merged and rounded or normalized to the final result 86.

Hence, hardware extensions of the inventive floating-point unit 10 depicted in FIG. 1, compared to a conventional 128-bit floating-point unit, include the operand latch 44 and the unpack circuit 12 for the third operand 100, as well as the 113×113 multiplier 14 for getting the 226-bit carry save product 70 sequentially in an iterative manner in a carry term 74 and a sum term 71, separated into a high part 72, 75 and a low part 73, 76 of the product 70. Further the hardware extensions include the left shifter 18, connected to the A2 register 46. Alternatively, the right shifter 20 may be implemented with a bit rotating function and used in subsequent cycles. The select circuit 24 after the shifters 18, 20 is enhanced by a 3-to-2 compressor 25 to combine the two product terms, the sum term 71 and the carry term 74 with the addend 77. A further extension is the leading zero counter 22 connected to the unpack circuit 12 of the addend operand 104 (operand B in this embodiment). Further the first feedback path 36 around the adder 26, which is an end-around-carry adder, connecting a carry output 91 of the adder 26 to the select circuit 24, is provided additionally to implement a first feedback path 36 for performing a wide addition operation of the intermediate product 70 and the -aligned addend 77 for the high parts 72, 75, 78 and the low parts 73, 76, 79. Finally the second feedback path 38, connecting the output of the adder 26 to the shifters 18, 20 for passing an intermediate wide result 86 through the shifters 18, 20 for normalization and a second pass through the adder 26 for rounding is provided additionally.

The data flow, shown in FIG. 1, follows in general a top-down structure. The input operands 100, 102, 104 are latched into the input registers 44, 40, 42, followed by unpacking. The multiplication operands 100, 102 are fed to the multiplier 14. The product 70, calculated by the multiplier 14, is fed to the select circuit 24 including the 3-to-2 compressor 25, and then latched through the A4 register 50 and B4 register 52 into the adder 26. This is performed together with latching the addend operand 104 through the select/swap circuit 16 and the A2 register 46 and the B2 register 48, respectively, and optionally shifting by the shifters 18, 20 (which is explained in more detail with reference to FIG. 4), to the adder 26. Left shifting is dependent on results of the leading zero counter 22, calculating a number of leading zeroes of the addend 104. The leading zero counter 22 may particularly be used with denormal operands. Thus, normalization of a denormal operand is possible before continuing operating with the operand. The first feedback loop 36 starts by feeding the carry out 91 of the intermediate low result 88 of the adder 26 back to the select circuit 24 with the 3-to-2 compressor 25. The result 87 and 88 of the adder 26 is fed to the D6 register 54 in subsequent cycles, where the second feedback loop 38 starts, feeding data back to the select/swap circuit 16 for the next iteration. Finally, the result 86 in the D6 register 54 is rounded by the round circuit 30 or normalized by the normalize circuit 32, respectively, depending on results of the leading zero anticipator 28. The final result may then be selected and packed in the select and pack unit 34 and latched into the R8 output register 56, feeding the data to a 128-bit result bus.

One or more methods according to embodiments of the present invention may thus include: computing a 226-bit-carry-save product 70 of the multiplication operands 100, 102 iteratively by a 113×113-bit multiplier 14, wherein a sum term 71 and a carry term 74 are separated into a high part 72, 75 and a low part 73, 76 of the product 70; aligning the high part 78 and the low part 79 of an addend operand 104 by a left shifter 18 connected to the dataflow, configured to deliver an aligned part of the addend 77; aligning the high part 78 and the low part 79 of the addend operand 104 by a right shifter 20 connected to the dataflow, configured to deliver an aligned addend 77; combining the two product terms 71, 74 with the addend 77 by a select circuit 24 connected to the outputs of the shifters 18, 20 including a 3-to-2 compressor 25; operating an adder 26 connected to the dataflow from the select circuit 24; performing wide addition of the intermediate product 70 and the aligned addend 77 for the high parts 72, 75, 78 and the low parts 73, 76, 79 in a first feedback path 36 connecting a carry output 91 of the adder 26 to the select circuit 24; and passing an intermediate wide result 86 in two subsequent cycles through the shifters 18, 20 for normalization and a second pass through the adder 26 for rounding in a second feedback path 38 connecting the output of the adder 26 to the shifters 18, 20.

Figure 2:
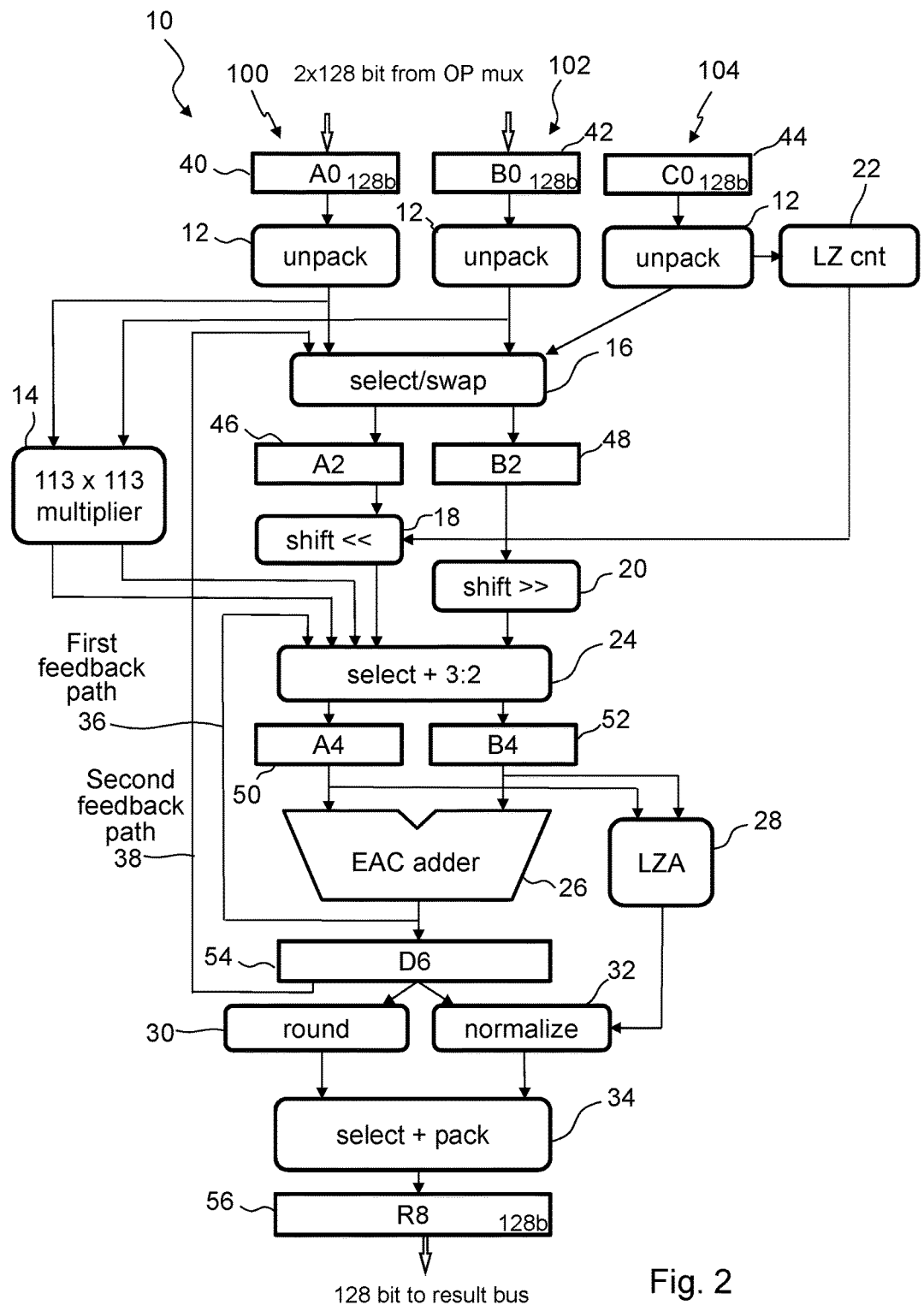
FIG. 2 depicts a data flow of a floating-point unit according to a further embodiment of the invention for performing binary floating-point arithmetic calculations, the floating-point unit being configured to implement a fused-multiply-add operation on three 128 bit wide operands A, B, C for an A×B+C operation.

In FIG. 2, a data flow of a floating-point unit 10 according to a further embodiment of the invention for performing binary floating-point arithmetic calculations is depicted, where the floating-point unit 10 is configured to implement a fused-multiply-add operation on three 128 bit wide operands A, B, C (100, 102, 104) for an A×B+C operation. The data flow is similar to the data flow shown in FIG. 1, except that in this embodiment the multiplication operands 100, 102 are A and B, where the third addend operand 104 is C. the principal arithmetical operation is the same as in FIG. 1, thus for explanation the description of FIG. 1 may be used.

FIG. 3 depicts the data flow in the adder loops S200, S202, separated into high parts 72, 75, 78 and low parts 73, 76, 79 of the data according to an embodiment of the invention. In the first adder loop S200 the low parts 73, 76, 79 are computed by adding the sum terms 73, 76 to the addend term 79 in order to obtain a low part 82 of a sum term 80, as well as a low part 85 of a carry term 83 and resulting in a low part 88 of the result 86, whereas in the second adder loop S202 the high parts 72, 75, 78 are computed by adding the sum terms 72, 75 to the addend term 78 in order to obtain a high part 81 of a sum term 80, as well as a high part 84 of a carry term 83, and resulting in a high part 87 of the result 86. Carry bits 90, 91 are accordingly shifted from the low parts 85, 88 to the high parts 84, 87.

Figure 4:
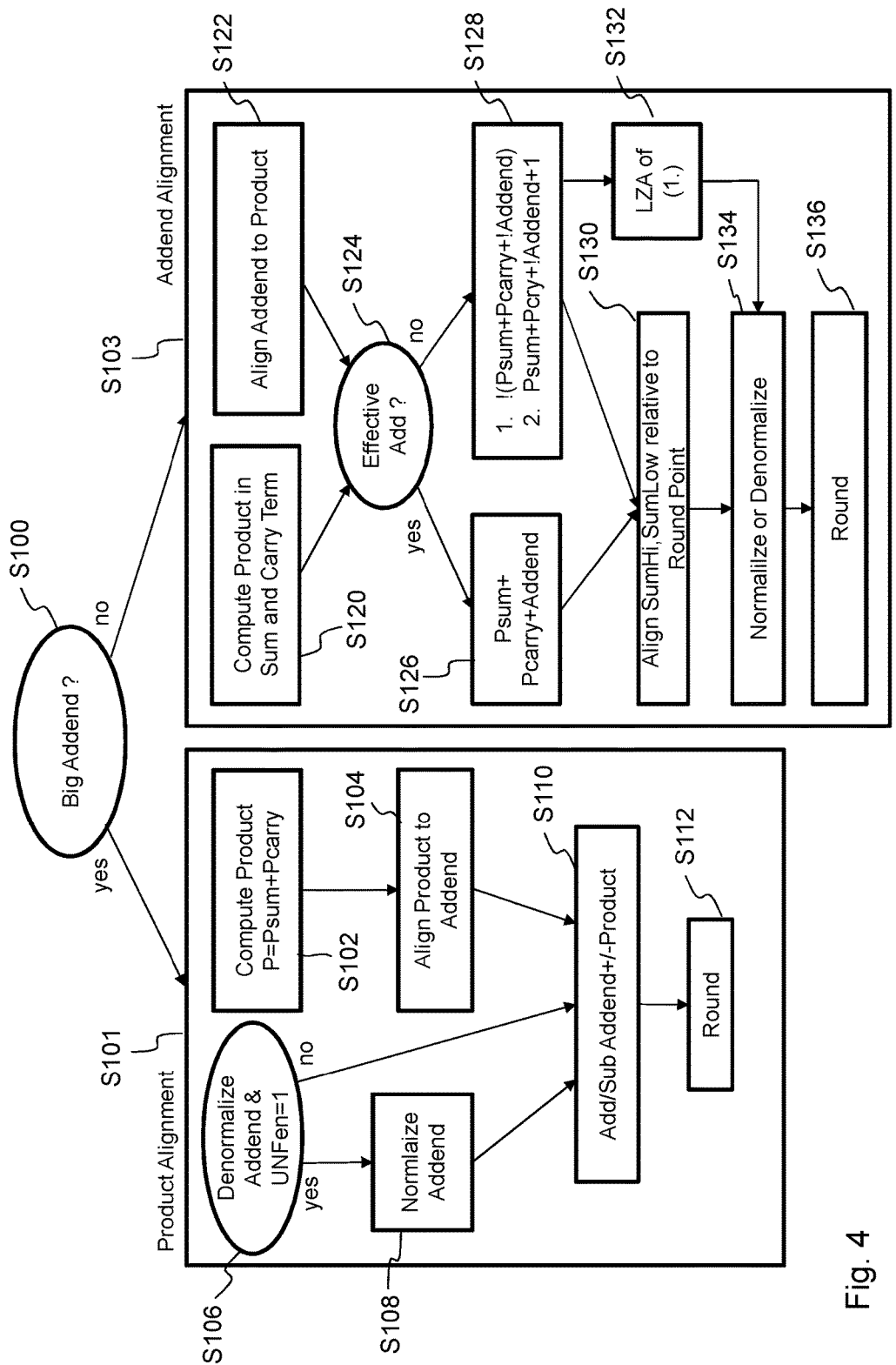
FIG. 4 depicts a flowchart of the data flow depending on a magnitude of the addend in relation to the product according to an embodiment of the invention.

In FIG. 4 a flowchart of the data flow depending on a magnitude of the addend 104 in relation to the product 70 (FIG. 3) according to an embodiment of the invention is shown.

Referring to FIGS. 1-4, in the case of a big addend 77, if an exponent of the addend 77 minus a number of leading zeroes of the addend 77 is greater than an exponent of the product 70 plus a constant, where the constant is at least two, the product 70 is aligned to the addend 77, S101. Next, in the case of a denormal addend 77 with an enabled underflow check, step S106, the addend 77 gets normalized in the shifter 18, step S108 (see FIG. 1). Denormal numbers are floating-point numbers where a significand without leading zeroes would lead to an exponent, which lies below the minimum exponent of the floating-point representation.

In parallel, in step S102, the product 70 is computed in the multiplier 14 with a carry term 74 and a sum term 71, separated in high parts 72, 75 and low parts 73, 76. The low part 79 and the high part 78 are added in two subsequent cycles to form a fully calculated low product and a fully calculated high product. In the left shifter 18 the low product and the high product are aligned in step S104 to the addend 77 based on the exponent difference and added/subtracted to the aligned addend 77 in the adder 26. Finally, the result 86 is rounded in step S112.

In the case of a small addend, if an exponent of the addend 77 minus a number of leading zeroes of the addend 77 is less or equal to an exponent of the product 70 plus a constant, where the constant is at least two, the low part 79 and high part 78 of the addend 77 get aligned to the product 70 by the shifters 18 and 20, S103. First, the product 70 is computed in step S120 in the multiplier 14 with a sum term 71 and carry term 74, separated in high parts 72, 75 and low parts 73, 76. In step S122, based on the exponent difference, the addend 77 is aligned by the shifters 18, 20 separated in a high addend 78 and a low addend 79.

A decision is made in step S124, if it's the case of an effective add operation. In the case of an effective add operation, the high parts 72, 75, 78 and the low parts 73, 76, 79 of the product 70 and the addend 77 are added sequentially by the select circuit 24 and the 3-to-2 compressor 25, step S126.

In the case of an effective subtract operation, in step S128 the negated sum of the product 70 and the negated addend 77 is computed as a first result 86, and the sum of the product 70 and the negated addend 77 plus one is computed as a second result 86 by the 3-to-2 compressor 25 and the adder 26 sequentially for the low part 73, 76 and the high part 72, 75. If a result of an end-around-carry operation equals to zero, the first result 86 is taken, otherwise the second result 86 is taken. The amount of leading zeros is determined by the leading zero anticipator 28 for later normalization in step S132. Alignment relative to the round point and normalization or denormalization shift is done in the shifters 18 and 20 separately for the low part 88 and the high part 87 of the result sum 86, steps S130, S134. The adder 26 is used for merging the low part 88 and the high part 87 of the result 86. Final rounding or normalization is performed as a last step S136 in order to get the final result.

Figure 5:
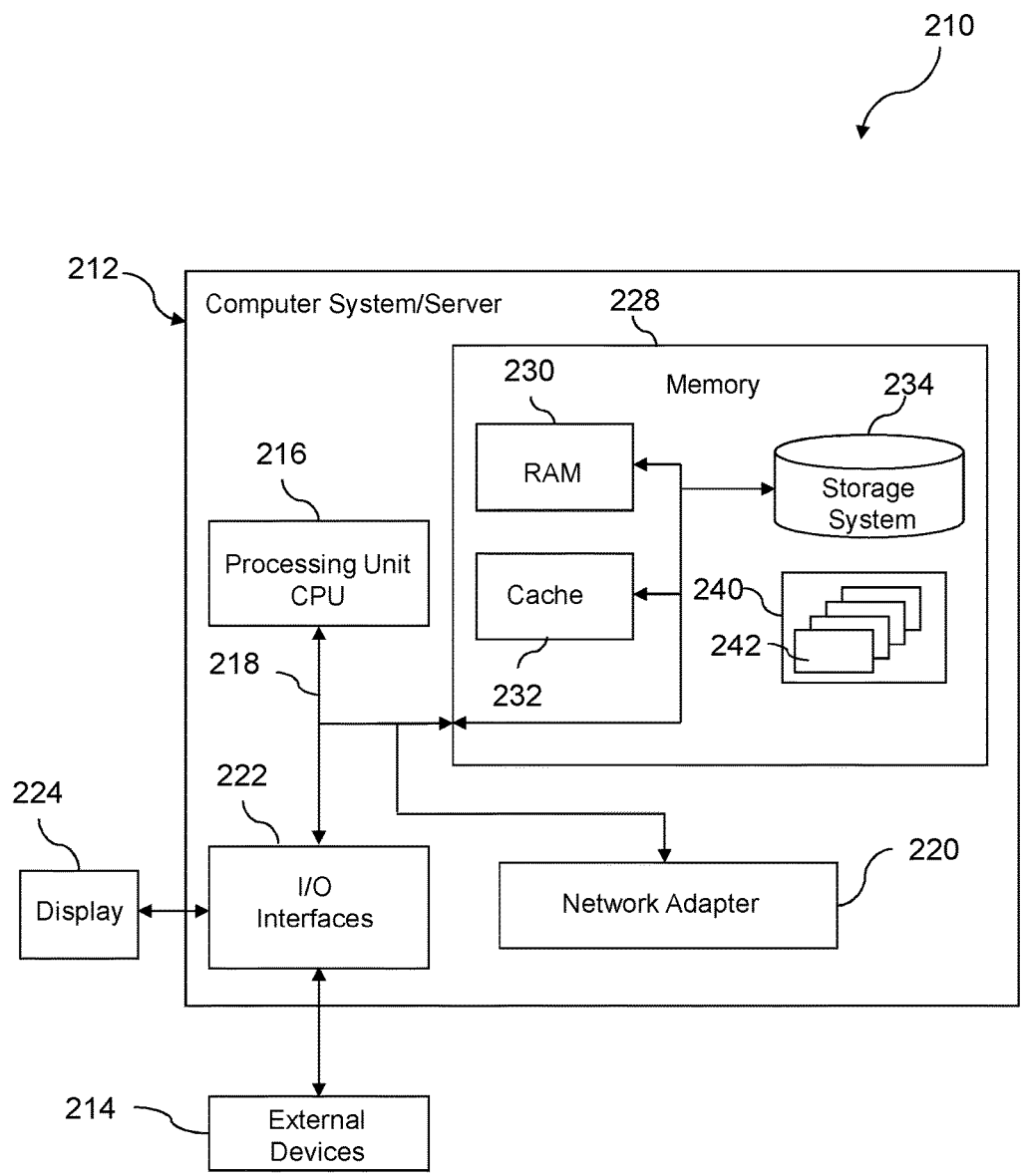
FIG. 5 depicts an example embodiment of a data processing system for executing a method according to one or more embodiments of the invention.

Referring now to FIG. 5, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A floating-point unit, configured to implement a fused-multiply-add operation on three 128 bit wide operands, the floating-point unit comprising:
    a 113×113-bit multiplier connected to a dataflow for multiplication operands and configured to compute a 226-bit-carry-save product iteratively, wherein a sum term and a carry term are separated into a high part and a low part of the product;
    a left shifter connected to the dataflow for a high part and a low part of an addend operand, configured to deliver an aligned part of an addend;
    a right shifter connected to the dataflow for the high part and the low part of the addend operand, configured to deliver the aligned part of the addend;
    a select circuit connected to the outputs of the shifters comprising a 3-to-2 compressor to combine the sum term and the carry term with the addend;
    an adder connected to output from the select circuit;
    a first feedback path connecting a carry output of the adder to the select circuit, comprising the 3-to-2 compressor, for performing a wide addition operation of an intermediate product and the addend for the high parts and the low parts in two subsequent additions; and
    a second feedback path, the second feedback path being separate from the first feedback path, and connecting the output of the adder to the left and right shifters within the dataflow upstream of the select circuit for passing an intermediate wide result through the left and right shifters for normalization and a second pass through the adder for rounding.

2. The floating-point unit according to claim 1, wherein the left shifter is implemented as a right shifter with a bit rotating function.

3. The floating-point unit according to claim 1, wherein the multiplier is configured to compute the high part and the low part of the product sequentially.

4. The floating-point unit according to claim 1, further comprising a leading zero counter connected to an unpack circuit of the addend operand.

5. The floating-point unit according to claim 1, wherein the right shifter facilitates aligning the product to the addend if an exponent of the addend minus a number of leading zeroes of the addend is greater than an exponent of the product plus a constant, where the constant is at least two.

6. The floating-point unit according to claim 5, wherein the left shifter facilitates normalizing the addend in the case of a denormal addend.

7. The floating-point unit according to claim 5, wherein the left shifter further facilitates aligning the high parts and the low parts of the product to the addend and merging to a single data part.

8. The floating-point unit according to claim 1, wherein the left and right shifters facilitate aligning the addend to the product by the left and/or right shifter if an exponent of the addend minus a number of leading zeroes of the addend is less or equal to an exponent of the product plus a constant, where the constant is at least two.

9. The floating-point unit according to claim 8, wherein the left and right shifters facilitate aligning the high part and the low part of the addend separately to the product.

10. The floating-point unit according to claim 8, wherein the select circuit comprising the 3-to-2compressor facilitates adding the high parts and the low parts of the product and the addend by the select circuit and the 3-to-2 compressor in the case of an effective add operation.

11. The floating-point unit according to claim 8, wherein the 3-to-2 compressor and the adder compute as a result a negated sum of the product and a negated addend if a result of an end-around-carry operation equals to zero, otherwise computing as a result the sum of the product and the negated addend plus one, in the case of an effective subtract operation.

12. A method for performing binary floating-point arithmetic calculations in a floating-point unit configured to implement a fused-multiply-add operation on three 128 bit wide operands, the method comprising:
  computing a 226-bit-carry-save product of the multiplication operands iteratively by a 113×113-bit multiplier, wherein a sum term and a carry term are separated into a high part and a low part of the product;
  aligning at least a high part and a low part of an addend operand, configured to deliver an aligned part of an addend by a left shifter connected to a dataflow;
  aligning the high part and the low part of the addend operand by a right shifter connected to the dataflow, configured to deliver the aligned part of the addend;
  combining the two product terms with the addend by a select circuit connected to the outputs of the shifters comprising a 3-to-2 compressor;
  operating an adder connected to output from the select circuit;
  performing wide addition of an intermediate product and the addend for the high parts and the low parts in two subsequent additions via a first feedback path connecting a carry output of the adder to the select circuit comprising the 3-to-2compressor; and
  passing an intermediate wide result through the shifters for normalization and a second pass through the adder for rounding via a second feedback path connecting the output of the adder to the left and right shifters within the dataflow upstream of the select circuit, the second feedback path being separate from the first feedback path.

13. The method according to claim 12, further comprising performing a left shift operation by a right shifter with a bit rotating function.

14. The method according to claim 12, further comprising computing the high part and the low part of the product sequentially by the multiplier.

15. The method according to claim 12, further comprising calculating a number of leading zeroes by a leading zero counter being connected to an unpack circuit of the addend operand.

16. The method according to claim 12, further comprising aligning the product to the addend if an exponent of the addend minus a number of leading zeroes of the addend is greater than an exponent of the product plus a constant, where the constant is at least two.

17. The method according to claim 16, further comprising normalizing the addend in the case of a denormal addend.

18. The method according to claim 16, further comprising aligning the high parts and the low parts of the product to the addend and merging to a single data part.

19. The method according to claim 12, further comprising aligning the addend to the product by the left and/or right shifter if an exponent of the addend minus a number of leading zeroes of the addend is less or equal to an exponent of the product plus a constant, where the constant is at least two.

20. The method according to claim 19, further comprising aligning the high part and the low part of the addend separately to the product by the left and/or right shifter.

21. The method according to claim 19, further comprising, in the case of an effective add operation, adding the high parts and the low parts of the product and the addend by the select circuit and the 3-to-2 compressor.

22. The method according to claim 19, further comprising, in the case of an effective subtract operation, computing as a result a negative sum of the product and a negative addend if a result of an end-around-carry operation equals to zero, otherwise computing as a result the sum of the product and the negative addend plus one.

23. A computer program product for performing binary floating-point arithmetic calculations in a floating-point unit, configured to implement a fused-multiply-add operation on three 128 bit wide operands, the computer program product comprising:
  a computer readable storage medium having program instructions embodied therewith, the program instructions being executable by a processor to cause the processor to perform a method comprising:
    computing a 226-bit-carry-save product of the multiplication operands iteratively by a 113×113-bit multiplier, wherein a sum term and a carry term are separated into a high part and a low part of the product;
    aligning at least a high part and a low part of an addend operand, configured to deliver an aligned part of an addend by a left shifter connected to a dataflow;
    aligning the high part and the low part of the addend operand by a right shifter connected to the dataflow, configured to deliver the aligned part of the addend;
    combining the two product terms with the addend by a select circuit connected to the outputs of the shifters comprising a 3-to-2 compressor;
    operating an adder connected to output from the select circuit;
    performing wide addition of an intermediate product in two subsequent additions and the addend for the high parts and the low parts via a first feedback path connecting a carry output of the adder to the select circuit comprising the 3-to-2 compressor; and passing an intermediate wide result through the shifters for normalization and a second pass through the adder for rounding via a second feedback path connecting the output of the adder to the left and right shifters within the dataflow upstream of the select circuit, the second feedback path being separate from the first feedback path.

\* \* \* \* \*